United States Patent Office 3,513,002
Patented May 19, 1970

3,513,002
CHEMICAL RESISTANT GLASS COMPOSITION FOR FIBERIZATION
Dominick Labino, Grand Rapids, Ohio, assignor to Johns-Manville Corporation, New York, N.Y., a corporation of New York
No Drawing. Filed Apr. 29, 1966, Ser. No. 546,178
Int. Cl. C03c *13/00, 3/08*
U.S. Cl. 106—50       7 Claims

ABSTRACT OF THE DISCLOSURE

A glass composition of a specific combination of glass forming oxides providing improved chemical resistance and of working properties amenable for fiberization into glass fibers of improved durability and suitable for use in reinforced resin products, consisting essentially of: $SiO_2$; $B_2O_3$; $Al_2O_3$; $Na_2O$; CaO; MgO; and, $F_2$, and optionally $K_2O$; BaO; and ZnO.

---

This invention relates to a glass composition and, more particularly, to a novel and improved glass composition for the manufacture of glass fibers.

Glass in a number of fibrous forms comprising staple fibers and continuous filaments or rovings, and in assorted woven and non-woven constructions or bodies, has over the years found a wide variety of uses and applications. One of the most significant and extensive areas of utility and service for typical glass fiber products has been in the reinforcement of resins and providing foundation or substratal components in resinous laminates and molded bodies. In this service, as well as in many others of its common fields of utility, glass fibers are often subjected to aggressive chemical conditions, particularly acid media. Moreover, the vulnerability of a glass composition to chemical attack is significantly dependent upon the extent of surface area exposed to the caustic elements or environment, and with the current, very fine glass fibers ranging down to submicron diameters, their susceptibility to corresion damage and degradation is therefore greatly multiplied.

It is the primary object of this invention to provide a new glass composition which is amendable to fiberization by conventional means or techniques, and possesses markedly improved chemical resistance.

It is also a primary object of this invention to provide improved glass fibers which are especially suitable for use in resin laminates, molded bodies and the like reinforced articles.

It is a further significant object to provide a relatively high silica content glass composition having low liquids temperatures and good working properties.

It is a specific and paramount object of this invention to provide a new glass composition which, is in the form of fine fibers or constructions formed thereof, is highly resistant to strong acids and the like aggressive acidic conditions or environments.

These and other objects and advantages, especially acid resistance, apparent from the hereinafter detailed description, are directly attributable to the concerted effects of the cooperation or interaction of a relatively narrow range of essential constituent oxide ingredients providing the new glass compositions of this invention. Specifically, the glass compositions of this invention in its broadest aspect consists essentially of those formed by the given components within the area or relatively proportions defined substantially by the following percentages by weight thereof:

| Ingredients: | Ranges |
|---|---|
| $SiO_2$ | 67.0–69.0 |
| $B_2O_3$ | 5.5– 7.0 |
| $Al_2O_3$ | 3.0– 5.0 |
| $Na_2O$ | 10.0–14.0 |
| $K_2O$ | 0.0– 1.5 |
| CaO | 3.0– 6.5 |
| MgO | 0.5– 4.0 |
| BaO | 0.0– 1.0 |
| ZnO | 0.0– 1.0 |
| $F_2$ | 0.0– 1.5 |

The compositions given above are calculated from batch and may vary insignificantly because of possible minor losses of volatile materials either initially present or formed during melting such as, for example, fluorine. Also, the amounts given for the $Al_2O_3$ constituent comprises any $Fe_2O_3$, $TiO_2$ or other members of this chemical group that may be present in the glass in trace amounts as impurities from the batch raw materials.

Glass compositions of this invention exhibiting the optimum properties, and hence tre preferred fiber compositions comprise the following in the approximate percentages by weight of:

| Ingredients: | Ranges |
|---|---|
| $SiO_2$ | 68.0–69.0 |
| $B_2O_3$ | 5.8– 6.0 |
| $Al_2O_3$ | 3.5– 4.5 |
| $Na_2O$ | 11.0–13.0 |
| $K_2O$ | 0.5– 1.0 |
| CaO | 4.0– 6.0 |
| MgO | 2.0– 3.0 |
| BaO | 0.0– 0.5 |
| ZnO | 0.0– 0.5 |
| $F_2$ | 0.0– 1.0 |

Aside from the pricipal objects and advantages of high acid resistance of this invention, glasses of the approximate range of formulation given provide melts with advantageous viscosity characteristics which render them particularly amenable to conventional fiberizing means and techniques, comprising composition softening points in the order of 1300° F., and effective low liquids temperatures of about 1600° F. with minimum divitrification or formation of crystals during fiber formation and attenuation, thus permitting working of the molten to soft glass at temperatures in which crystals do not form. As such the glass compositions of this invention facilely fiberize with common means and apparatus into fine diameter fibers of any commercial dimensions ranging down to submicron diameters, for example from approximately 25 micron through to approximately one half or less micron.

Following are specific examples of the glass compositions of this invention and of fibrous products thereof. These exemplary compositions are given for the purpose of illustration, and to demonstrate the pronounced improvements attributable to the compositions of this invention. The exemplary compositions or admixture of oxide ingredients forming the same and the method of producing the glasses or fibers thereof, and the properties of each, are not to be construed as limiting this invention to any specific compositions, means or conditions, etc., other than those set forth hereinbefore as essential.

EXAMPLE 1

The preferred specific glass composition of this invention consists of, in approximate percentages by weight:

| Constituents: | Percentages by weight |
|---|---|
| $SiO_2$ | 68.6 |
| $B_2O_3$ | 5.9 |
| $Al_2O_3$ | 4.1 |
| $Na_2O$ | 11.9 |
| $K_2O$ | 0.8 |
| $CaO$ | 5.0 |
| $MgO$ | 2.6 |
| $BaO$ | 0.2 |
| $ZnO$ | 0.2 |
| $F_2$ | 0.7 |

This glass exhibited the following composition properties of:

Softening point—1320° F.
Density—2.470 p.c.f.
Liquidus—1600° F.
Index of refraction—1.510

Upon fiberizing by drawing a melt of the composition of Example 1 into continuous strands averaging about 0.00053 inch (approximately 13 microns) in diameter, the acid resistance thereof was determined and compared with that of a commercial "E" glass, the standard of the industry, which comprises the composition of U.S. Pat. No. 2,334,961, and also with a glass of the composition of Example III of U.S. Pat. No. 3,085,887. One gram samples of continuous strands of like diameters of each of these three glasses consisting of this invention comprising the composition of Example 1 and the two prior art compositions of the aforementioned patents, were respectively weighed and each placed in Erlenmeyer flasks with 200 cc. of the subsequently identified reagents diluted to the given concentrations. The flasks were marked for identification and each placed in a water bath at 205° F. and held for the periods indicated. Upon expiration of the test periods, the remaining fibers were separated from the reagent by filtration and repeatedly washed with hot distilled water. The samples of residual fiber were then fired to remove organic matter (filter paper), cooled in a desiccator and weighed. The difference between the final weight and the original weight was determined and the percentage loss due to the chemical attack was calculated and recorded in the following table. All pertinent data from the aforedescribed tests of each sample are set forth in the table below.

A second sample of the glass composition of Example 1 drawn and attenuated to substantially finer diameter fibers averaging about 0.0002 inch (approximately 5 microns), and thus more susceptible to aggressive elements because of greater surface exposure, was also evaluated in an acid environment and compared under identical conditions with the same size very fine fibers of glass of the composition of Example III of U.S. Pat. No. 3,085,887.

In this comparative examination, a one gram sample of each the very fine fiber of the composition of Example 1 above and of the said composition of No. 3,085,887 were respectively dispersed in 300 ml. of 1 N sulfuric acid ($H_2SO_4$) and retained for one hour at boiling temperature. Upon recovering the residual fiber samples from each acid solution following the hour exposure, and washing thoroughly, drying, etc. as in the previous test, the difference in the final weight from the original weight of each specimen due to any acid attack was determined as the percentage lost. The loss of the preferred composition of this invention exemplified by Example 1 was 0.6% in weight whereas the loss in the prior art standard comprising the identified composition of the Example III of No. 3,085,887 under identical conditions was 17.0%.

Additional specific examples illustrating effective acid resistant glass compositions of this invention comprise in approximate percentages by weight the following:

| Ingredients | Examples | | |
|---|---|---|---|
| | 2 | 3 | 4 |
| $SiO_2$ | 68.1 | 68.1 | 68.0 |
| $B_2O_3$ | 6.0 | 6.0 | 6.0 |
| $Al_2O_3$ | 4.0 | 4.0 | 4.0 |
| $Na_2O$ | 12.5 | 12.5 | 12.5 |
| $K_2O$ | | | |
| $CaO$ | 6.5 | 4.2 | 4.1 |
| $MgO$ | 0.5 | 2.9 | 2.9 |
| $BaO$ | | | |
| $ZnO$ | | | |
| $F_2$ | 1.0 | 1.0 | 1.0 |

What I claim is:

1. A glass composition of improved chemical resistance and low liquids temperature consisting essentially of the following in percentage by weight of:

| | |
|---|---|
| $SiO_2$ | 68.0–68.6 |
| $B_2O_3$ | 5.9–6.0 |
| $Al_2O_3$ | 4.0–4.1 |
| $Na_2O$ | 11.9–12.5 |
| $K_2O$ | 0.0–0.8 |
| $CaO$ | 4.1–6.5 |
| $MgO$ | 0.5–2.9 |
| $BaO$ | 0.0–0.2 |
| $CnO$ | 0.0–0.2 |
| $F_2$ | 0.0–1.0 |

2. The chemical resistance glass composition of claim 1 in the form of fine fibers.

3. A glass composition of improved acid resistance consisting essentially of the following in approximate percentages by weight:

| | |
|---|---|
| $SiO_2$ | 68.6 |
| $B_2O_3$ | 5.9 |
| $Al_2O_3$ | 4.1 |
| $Na_2O$ | 11.9 |
| $K_2O$ | 0.8 |
| $CaO$ | 5.0 |
| $MgO$ | 2.6 |
| $BaO$ | 0.2 |
| $ZnO$ | 0.2 |
| $F_2$ | 0.7 |

TABLE —PRELIMINARY TEST

| Glass Compositions | HCl 10% 88.5 hr. | HCl 10% 114 hr. | HCl 10% 336 hr. | HCL 36.5% 336 hr. | $H_2SO_4$ 10% 336 hr. | $H_2SO$ 50% 336 hr. |
|---|---|---|---|---|---|---|
| "E" Glass | | | 47.2 | | 44.4 | 2.67 |
| No. 3,085,887 | 42.5 | 43.4 | 43.7 | 38.0 | 4.90 | .012 |
| Example 1 | 4.10 | 1.59 | 3.18 | 0.44 | 1.86 | .047₄ |

4. The acid resistant glass composition of claim 3 in the form of fine fibers.

5. A glass composition of improved acid resistance in the form of fine fibers consisting essentially in percentages by weight of:

| | |
|---|---|
| $SiO_2$ | 68.1 |
| $B_2O_3$ | 6.0 |
| $Al_2O_3$ | 4.0 |
| $Na_2O$ | 12.5 |
| $CaO$ | 6.5 |
| $MgO$ | 0.5 |
| $F_2$ | 1.0 |

6. A glass composition of improved acid resistance in the form of fine fibers consisting essentially in percentages by weight of:

| | |
|---|---|
| $SiO_2$ | 68.1 |
| $B_2O_3$ | 6.0 |
| $Al_2O_3$ | 4.0 |
| $Na_2O$ | 12.5 |
| CaO | 4.2 |
| MgO | 2.9 |
| $F_2$ | 1.0 |

7. A glass composition of improved acid resistance in the form of fine fibers consisting essentially in approximate percentages by weight of:

| | |
|---|---|
| $SiO_2$ | 68.0 |
| $B_2O_3$ | 6.0 |
| $Al_2O_3$ | 4.0 |
| $Na_2O$ | 12.5 |
| CaO | 4.1 |
| MgO | 2.9 |
| $F_2$ | 1.0 |

References Cited

UNITED STATES PATENTS

| | | | |
|---|---|---|---|
| 2,877,124 | 3/1959 | Welsch | 106—54 |
| 3,013,888 | 12/1961 | De Lajarte | 106—50 |
| 3,085,887 | 4/1963 | Labino | 106—50 |
| 3,054,686 | 9/1962 | Hagedorn | 106—54 |

FOREIGN PATENTS 643,414  5/1964  Belgium.

HELEN M. McCARTHY, Primary Examiner

U.S. Cl. X.R.

106—54